H. C. BESHLER.
Corn Planter.

No. 107,857.  Patented Oct. 4, 1870.

Witnesses:
A. Bennewendorf
D. S. Mabee

Inventor:
H. C. Beshler
per ──── Attorneys.

United States Patent Office.

HENRY C. BESHLER, OF BERRYSBURG, PENNSYLVANIA.

Letters Patent No. 107,857, dated October 4, 1870.

IMPROVEMENT IN CORN-PLANTERS.

The Schedule referred to in these Letters Patent and making part of the same

*To all whom it may concern:*

Be it known that I, HENRY C. BESHLER, of Berrysburg, in the county of Dauphin and State of Pennsylvania, have invented a new and useful Improvement in Corn-planter; and I do hereby declare that the following is a full, clear, and exact description thereof, which will enable others skilled in the art to make and use the same, reference being had to the accompanying drawing forming part of this specification, in which—

My invention has for its object to furnish an improved corn-planter, which shall be so constructed and arranged as to drop the corn uniformly, and at the proper time and in such a way that the operator may see the kernels as they pass down the conductor-spouts; and It consists in the construction and combination of various parts of the machine, as hereinafter more fully described.

A represents the frame of the machine.

B is the seed-box or hopper, which may be made long, to extend entirely across the machine, and which is supported by standards attached to the frame A.

Figure 1:
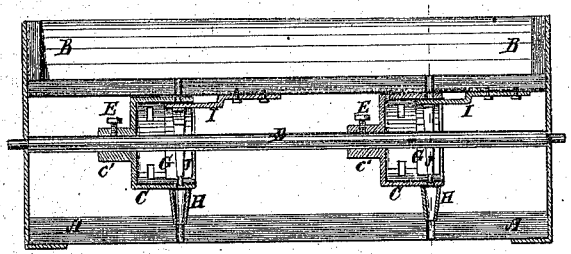
Figure 1 is a detail sectional view of my improved machine, taken through the line $x\,x$, fig. 2.
Figure 2:
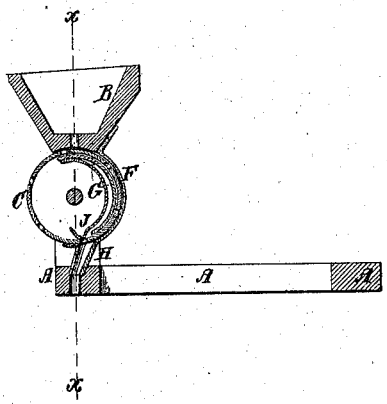
Figure 2 is a detail sectional view of my improved machine, taken through the line $y\,y$, fig. 1.

In the bottom of the hoppers B are formed small holes, through which the seed may pass to the dropping-drums or cylinders C, which are made hollow and open at one end, as shown in fig. 1.

Upon the end of the drum C, through which the shaft D passes, is formed a sleeve or hub, $c'$, fitting upon the said shaft D, to which it is adjustably secured by set-screws E, which pass through the projecting parts of said hubs or sleeves, and the forward ends of which enter short grooves in the said shaft D.

In the rim of the drum C are formed two, more or less, sets of holes, which may be of different shape and size, so that, by shifting the drums C upon the shaft D, to bring one or the other of the sets of dropping-holes beneath the discharge-openings in the bottom of the hopper B, the corn may be dropped in greater or lesser quantity, and in hills at a greater or lesser distance apart, as may be desired.

The seed is kept from dropping out of the holes in the rim of the drums C, while being carried around to the conductor-spouts by the guards or shields F G.

The upper end of the outer guard or shield F is attached to the hopper B, and so formed as not to interfere with the movement of the drums C in adjusting them.

The lower end of the shield or guard G terminates just in front of the upper end of the spout H, so that the holes in the rims of the drums C may be uncovered while the seed is dropping into the said spouts.

J is a spring, secured to the guard or shield G, and so formed that, as the holes containing the seed pass out from beneath the lower end of the shield or guard, the downwardly-projecting part of said spring may enter the hole containing the seed sufficiently to cause the seed to drop into the conductor-spout, and, at the same time, said spring being so formed as not to interfere with the movement of the drums C in either direction, by catching in the holes of the said drums.

The shaft D is driven from the driving-wheels of the machine in the ordinary manner.

Having thus described my invention,

I claim as new and desire to secure by Letters Patent—

1. The hollow drums C, for dropping the seed, constructed and connected with the shaft D, substantially as herein shown and described and for the purpose set forth.

2. The combination of the shield or guards F G with the hollow drums C, hopper B, dropping-drums C, and conductor-spouts H, substantially as herein shown and described and for the purpose set forth.

3. The combination of the spring J with the inner shield or guard G and hollow dropping-drum C, substantially as herein shown and described and for the purpose set forth.

HENRY C. BESHLER.

Witnesses:
J. D. SNYDER,
D. K. McCLURE.